United States Patent

Huang et al.

(10) Patent No.: US 9,847,188 B2
(45) Date of Patent: Dec. 19, 2017

(54) KEY STRUCTURE

(71) Applicant: PRIMAX ELECTRONICS LTD., Taipei (TW)

(72) Inventors: Wei-Yung Huang, Taipei (TW); Che-Wei Yang, Taipei (TW); Chen-Hsuan Hsu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 40 days.

(21) Appl. No.: 15/194,046

(22) Filed: Jun. 27, 2016

(65) Prior Publication Data

US 2017/0294277 A1 Oct. 12, 2017

(30) Foreign Application Priority Data

Apr. 8, 2016 (TW) .............................. 105111070 A

(51) Int. Cl.
*H01H 9/26* (2006.01)
*H01H 13/72* (2006.01)
*H01H 13/76* (2006.01)
*H01H 13/14* (2006.01)
*H01H 13/52* (2006.01)

(52) U.S. Cl.
CPC ............ *H01H 13/14* (2013.01); *H01H 13/52* (2013.01)

(58) Field of Classification Search
CPC ............... H01H 13/704; H01H 13/705; H01H 13/7065; H01H 3/125
USPC ........ 200/5 A, 344, 341, 345, 517; 400/682, 400/490–496; 361/679.11, 679.08, 361/679.09, 679.12–679.17
See application file for complete search history.

(56) References Cited

U.S. PATENT DOCUMENTS

| | | | | |
|---|---|---|---|---|
| 5,532,904 A | * | 7/1996 | Sellers | G06F 1/1616 200/344 |
| 6,172,868 B1 | * | 1/2001 | Oura | G06F 1/1616 200/344 |
| 6,529,370 B1 | * | 3/2003 | Kamishima | G06F 1/1616 200/5 A |
| 9,748,058 B2 | * | 8/2017 | Chen | H01H 13/84 |

* cited by examiner

*Primary Examiner* — Renee Luebke
*Assistant Examiner* — Lheiren Mae A Caroc
(74) *Attorney, Agent, or Firm* — Kirton McConkie; Evan R. Witt

(57) ABSTRACT

A key structure includes a first movable plate, a second movable plate, a keycap, a first linkage lever and a second linkage lever. The second movable plate is disposed over the first movable plate. The keycap is disposed over the second movable plate. The first linkage lever is connected with the keycap and the first movable plate. The second linkage lever is connected with the keycap and the second movable plate. While the first movable plate is moved in a first direction and the second movable plate is moved in a second direction, the first linkage lever and the second linkage lever are moved in different directions, so that a height of the keycap is reduced.

12 Claims, 8 Drawing Sheets

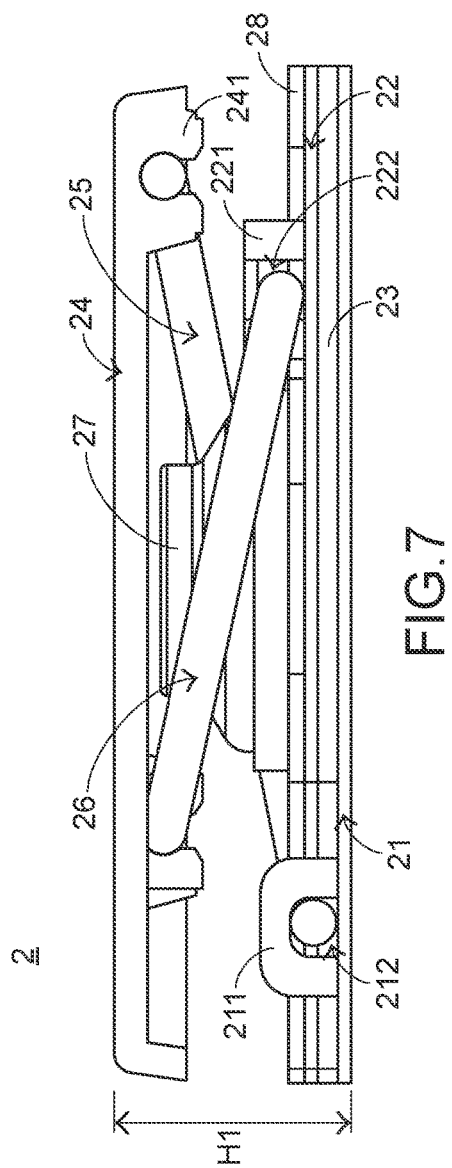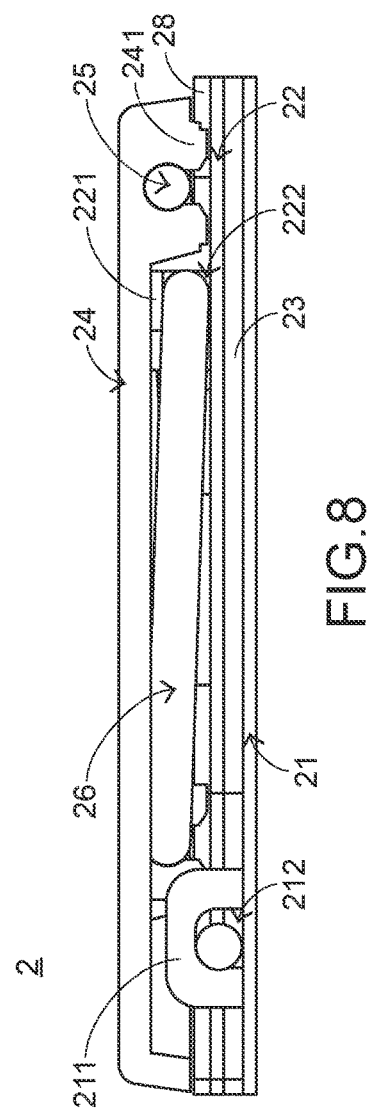

KEY STRUCTURE

FIELD OF THE INVENTION

The present invention relates to a key structure, and more particularly to a key structure with a changeable height.

BACKGROUND OF THE INVENTION

Generally, the widely-used peripheral input device of a computer system includes for example a mouse, a keyboard, a trackball, or the like. Via the keyboard, characters or symbols can be directly inputted into the computer system. As a consequence, most users and most manufacturers of input devices pay much attention to the development of keyboards. As known, a keyboard with scissors-type connecting elements is one of the widely-used keyboards.

FIG. 1 is a schematic perspective view illustrating the structure of a conventional notebook computer. As shown in FIG. 1, the conventional notebook computer 1 comprises a keyboard base 10, a top cover 11, a rotary shaft 12 and a keyboard 13. The top cover 11 comprises a display screen 111. The top cover 11 is rotatable through the rotary shaft 12. Consequently, the top cover 11 is closed to cover the keyboard base 10, or the top cover 11 is uplifted to allow the notebook computer 1 to be in a usage status. The keyboard 13 is installed on the keyboard base 10. When the keyboard 13 is operated by the user, a corresponding key signal is generated. Meanwhile, the computer is in a working mode.

The key structure of the keyboard 13 will be illustrated as follows. For succinctness, only one key structure is shown. FIG. 2 is a schematic side cross-sectional view illustrating a key structure of a conventional keyboard. As shown in FIG. 2, the conventional key structure 130 of the keyboard 13 comprises a keycap 1301, a scissors-type connecting element 1302, a rubbery elastomer 1303, a membrane switch circuit member 1304 and a base plate 1305. The keycap 1301, the scissors-type connecting element 1302, the rubbery elastomer 1303 and the membrane switch circuit member 1304 are supported by the base plate 1305. The scissors-type connecting element 1302 is used for connecting the base plate 1305 and the keycap 1301.

The scissors-type connecting element 1302 is arranged between the base plate 1305 and the keycap 1301, and the base plate 1305 and the keycap 1301 are connected with each other through the scissors-type connecting element 1302. The rubbery elastomer 1303 is enclosed by the scissors-type connecting element 1302.

The membrane switch circuit member 1304 comprises plural key intersections (not shown). When one of the plural key intersections is triggered, a corresponding key signal is generated. The rubbery elastomer 1303 is disposed on the membrane switch circuit member 1304. Each rubbery elastomer 1303 is aligned with a corresponding key intersection. When the rubbery elastomer 1303 is depressed, the rubbery elastomer 1303 is subjected to deformation to push the corresponding key intersection of the membrane switch circuit member 1304. Consequently, the corresponding key signal is generated.

The operations of the conventional key structure 130 in response to the depressing action of the user will be illustrated as follows. Please refer to FIG. 1 again. When the keycap 1301 is depressed, the keycap 1301 is moved downwardly to push the scissors-type connecting element 1302 in response to the depressing force. As the keycap 1301 is moved downwardly relative to the base plate 1305, the keycap 1301 pushes the corresponding rubbery elastomer 1303. At the same time, the rubbery elastomer 1303 is subjected to deformation to push the membrane switch circuit member 1304 and trigger the corresponding key intersection of the membrane switch circuit member 1304. Consequently, the membrane switch circuit member 1304 generates a corresponding key signal. When the keycap 1301 is no longer depressed by the user, no external force is applied to the keycap 1301 and the rubbery elastomer 1303 is no longer pushed by the keycap 1301. In response to the elasticity of the rubbery elastomer 1303, the rubbery elastomer 1303 is restored to its original shape to provide an upward elastic restoring force. Consequently, the keycap 1301 is returned to its original position where it is not depressed.

Recently, a touch device is introduced into the market. The touch device is operated by using the user's finger directly or using a touch pen. Since the touch device is easy to use, many users and many manufacturers pay much attention to the touch device. For example, the display screen 111 of the notebook computer 1 is a touch screen with a touch control function. Moreover, a notebook computer having an inversely foldable screen is introduced into the market. FIG. 3 is a schematic perspective view illustrating a conventional notebook computer having an inversely foldable screen, in which the notebook computer is in a touch control mode. After the top cover 11 of the notebook computer 1 is rotated in the direction toward a rear side of the keyboard base 10 through the rotary shaft 12, the top cover 11 is folded to be contacted with a rear surface of the keyboard base 10 and the display screen 111 is exposed. Meanwhile, the notebook computer 1 has the outer appearance of a touch device. Since the display screen 111 is a touch screen, the notebook computer 1 can be used as a touch device.

However, the keyboard 13 of the notebook computer 1 in the touch control mode is also exposed. Consequently, when the notebook computer 1 is held by the user's hands, the fingers of the user may press the key structures 130. Since the pressed key structures 130 are moved downwardly to form a concave region, it is difficult for the user to stably hold the notebook computer 1. Moreover, if the key structure 130 is erroneously triggered when the notebook computer 1 is held by the user's hands, the notebook computer 1 also generates a key signal. Under this circumstance, the erroneous operation is generated. In other words, the conventional key structure for the notebook computer having an inversely foldable screen is not user-friendly.

Therefore, there is a need of providing a key structure whose height is changeable according to the outer appearance of the notebook computer.

SUMMARY OF THE INVENTION

The present invention provides a key structure with a changeable height.

In accordance with an aspect of the present invention, there is provided a key structure. The key structure includes a first movable plate, a second movable plate, a separation plate, a keycap, a first linkage lever and second linkage lever. The second movable plate is disposed over the first movable plate. The separation plate is arranged between the first movable plate and the second movable plate. The first movable plate and the second movable plate are separated from each other by the separation plate. The keycap is disposed over the second movable plate, and movable relative to the separation plate. The first linkage lever is connected with the keycap and the first movable plate. A first end and a second end of the first linkage lever are movable on the first movable plate. The second linkage lever is connected with the keycap and the second movable plate. A first end and a second end of the second linkage lever are movable on the second movable plate. While the first movable plate is moved in a first direction and the second movable plate is moved in a second direction opposed to the first direction, the first linkage lever is pushed by the first movable plate in the first direction and the second linkage lever is pushed by the second movable plate in the second direction. Consequently, a height of the keycap is reduced.

From the above descriptions, the key structure of the present invention uses the first linkage lever and the second linkage lever as a mechanism for lifting or lowering the keycap. The first linkage lever is connected with the keycap and the first movable plate. The second linkage lever is connected with the keycap and the second movable plate. For reducing the height of the keycap, the first movable plate is controlled to be moved in the first direction and the second movable plate is correspondingly moved in the second direction. Consequently, the first linkage lever is moved in the first direction and the second linkage lever is moved in the second direction. Under this circumstance, the keycap is moved downwardly, and thus the height of the keycap is reduced.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 7 is a schematic side cross-sectional view illustrating the key structure according to the embodiment of the present invention, in which the keycap of the key structure is not depressed;

FIG. 8 is a schematic side cross-sectional view illustrating the key structure according to the embodiment of the present invention, in which the keycap of the key structure is depressed;

DETAILED DESCRIPTION OF THE PREFERRED EMBODIMENT

For solving the drawbacks of the conventional technologies, the present invention provides a key structure with a changeable height.

Figure 4:
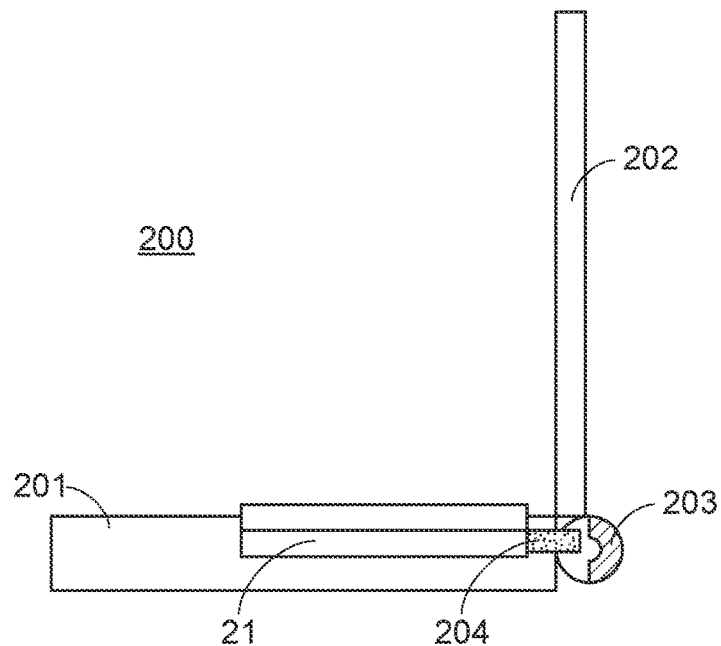
FIG. 4 is a schematic side cross-sectional view illustrating a notebook computer with key structures of the present invention.
Figure 5:
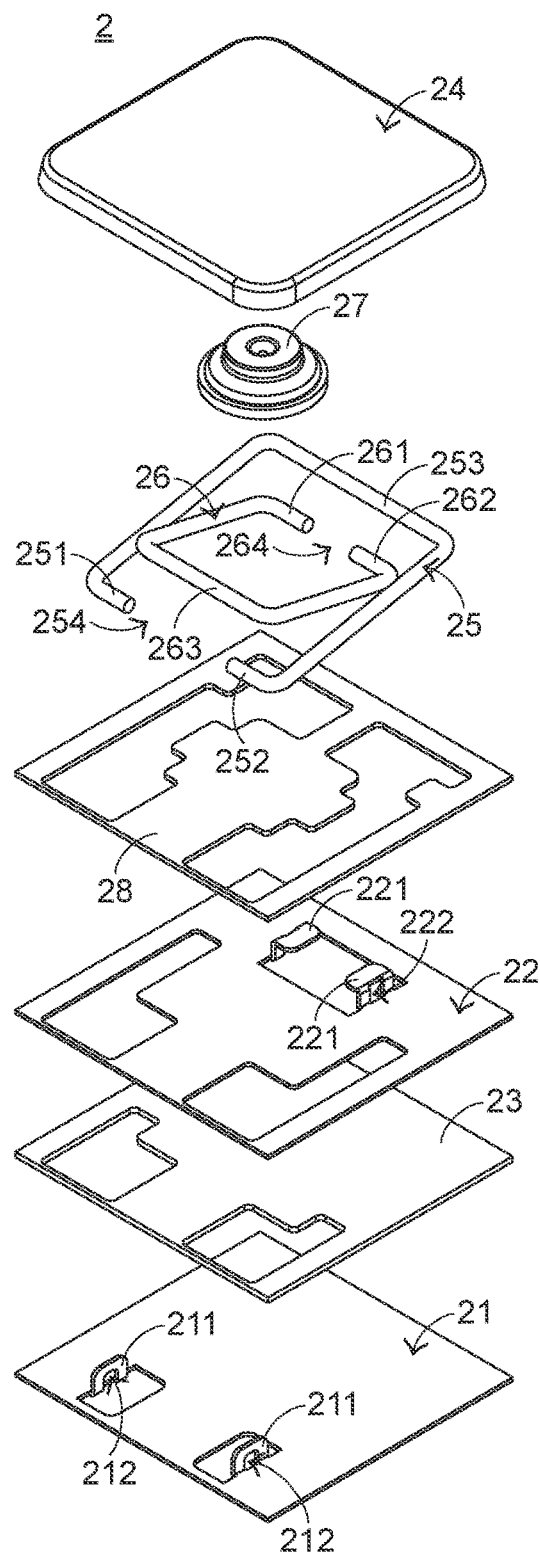
FIG. 5 is a schematic exploded view illustrating a key structure according to an embodiment of the present invention.
Figure 6:
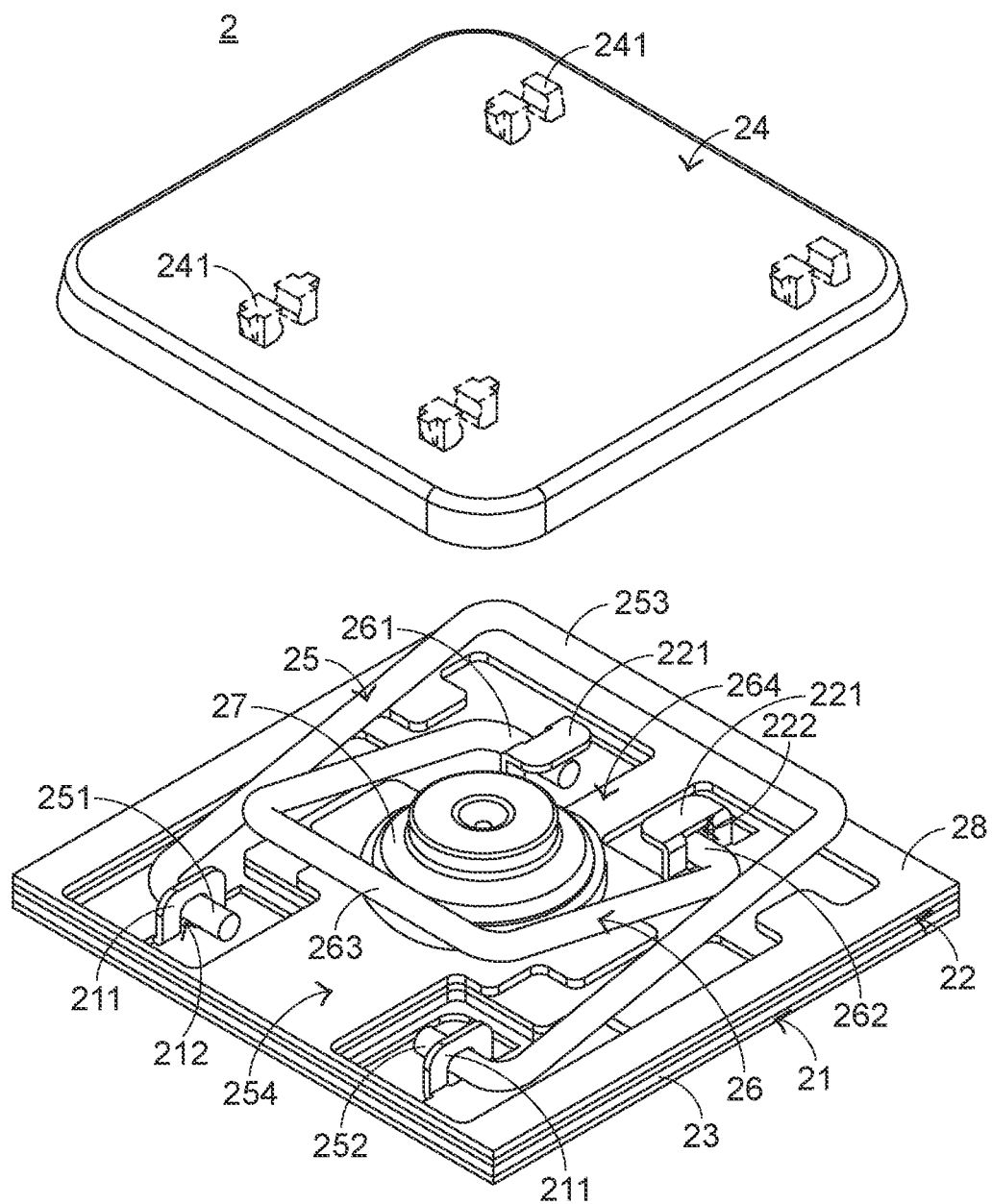
FIG. 6 is a schematic assembled view illustrating the key structure according to the embodiment of the present invention.

Please refer to FIGS. 4, 5 and 6. FIG. 4 is a schematic side cross-sectional view illustrating a notebook computer with key structures of the present invention. FIG. 5 is a schematic exploded view illustrating a key structure according to an embodiment of the present invention. FIG. 6 is a schematic assembled view illustrating the key structure according to the embodiment of the present invention. All components of the key structure 2 can be seen in FIG. 5. In this embodiment, the key structure 2 comprises a first movable plate 21, a second movable plate 22, a separation plate 23, a keycap 24, a first linkage lever 25, a second linkage lever 26, an elastic element 27 and a membrane switch circuit member 28. The first movable plate 21 is installed in a keyboard base 201 of a notebook computer 200. The keyboard base 201 is connected with a top cover 202. A rotary shaft 203 is connected with a transmission mechanism 204. The top cover 202 is rotatable relative to the keyboard base 20 through the rotary shaft 203. As the top cover 202 is rotated to different positions, the transmission mechanism 204 is enabled to allow the notebook computer 200 to be in different operation modes. For example, in case that the top cover 202 is closed to cover the keyboard base 201, the notebook computer 200 is in a hibernation mode or a power-off mode. Whereas, in case that the top cover 202 is uplifted to expose the key structures 2, the notebook computer 200 is in a usage mode. When the top cover 202 is inversely folded to be contacted with a rear surface of the keyboard base 201, the notebook computer 200 is in a touch control mode.

Please refer to FIGS. 5 and 6. The second movable plate 22 is disposed over the first movable plate 21. The separation plate 23 is arranged between the first movable plate 21 and the second movable plate 22. The first movable plate 21 and the second movable plate 22 are separated from each other by the separation plate 23. The keycap 24 is disposed over the second movable plate 22 and exposed outside the keyboard base 201. The key 24 is movable upwardly or downwardly relative to the separation plate 23. The first linkage lever 25 is connected with the keycap 24 and the first movable plate 21. Moreover, a first end and a second end of the first linkage lever 25 are movable on the first movable plate 21. Similarly, the second linkage lever 26 is connected with the keycap 24 and the second movable plate 22. A first end and a second end of the second linkage lever 26 are movable on the second movable plate 22. The membrane switch circuit member 28 is disposed over the first movable plate 21. When the keycap 24 is moved downwardly to trigger the membrane switch circuit member 28, a key signal corresponding to the keycap 24 is generated. The elastic element 27 is arranged between the keycap 24 and the membrane switch circuit member 28. When the elastic element 27 is pushed by the keycap 24, the membrane switch circuit member 28 is triggered by the elastic element 27. In an embodiment, the elastic element 27 is a rubbery elastomer.

The structure for connecting the first movable plate 21 and the first linkage lever 25 will be illustrated as follows.

The first movable plate 21 comprises plural first fixing parts 211 and plural first sliding slots 212. The plural first fixing parts 211 are disposed on a top surface of the first movable plate 21. The plural first fixing parts 211 are used for fixing the first linkage lever 25 on the first movable plate 21. Each first sliding slot 212 corresponds to one first fixing part 211. Moreover, the first sliding slot 212 is arranged between the corresponding first fixing part 211 and the first movable plate 21. The first end and the second end of the first linkage lever 25 are inserted into the corresponding first sliding slots 212, and thus the first linkage lever 25 is connected with the first movable plate 21. In this embodiment, the plural first fixing parts 211 are integrally formed with the first movable plate 21, and the first movable plate 21 is made of a metallic material.

Moreover, the first linkage lever 25 comprises a first contact segment 251, a second contact segment 252 and a first extension segment 253. The first contact segment 251 is located at the first end of the first linkage lever 25 and inserted into the corresponding first sliding slot 212 (e.g., the left first sliding slot 212 as shown in FIG. 6). The second contact segment 252 is located at the second end of the first linkage lever 25 and inserted into the corresponding first sliding slot 212 (e.g., the right first sliding slot 212 as shown in FIG. 6). The first extension segment 253 is arranged between the first contact segment 251 and the second contact segment 252. Moreover, a middle region of the first extension segment 253 is connected with the keycap 24. There is a first gap 254 between the first contact segment 251 and the second contact segment 252 of the first linkage lever 25. The combined structure of the first linkage lever 25 and the first movable plate 21 is shown in FIG. 6. Moreover, the first gap 254 is also arranged between the corresponding first fixing parts 211 of the first movable plate 21. In this embodiment, the first contact segment 251 and the second contact segment 252 are integrally formed with the first extension segment 253, and the first linkage lever 25 is made of a metallic material.

Please refer to FIGS. 5 and 6. The second movable plate 22 comprises plural second fixing parts 221 and plural second sliding slots 222. The plural second fixing parts 221 are disposed on a top surface of the second movable plate 22. The plural second fixing parts 221 are used for fixing the second linkage lever 26 on the second movable plate 22. Each second sliding slot 222 corresponds to one second fixing part 221. Moreover, the second sliding slot 222 is arranged between the corresponding second fixing part 221 and the second movable plate 22. The first end and the second end of the second linkage lever 26 are inserted into the corresponding second sliding slots 222, and thus the second linkage lever 26 is connected with the second movable plate 22. In this embodiment, the plural second fixing parts 221 are integrally formed with the second movable plate 22, and the second movable plate 22 is made of a metallic material.

Moreover, the second linkage lever 26 comprises a third contact segment 261, a fourth contact segment 262 and a second extension segment 263. The third contact segment 261 is located at the first end of the second linkage lever 26 and inserted into the corresponding second sliding slot 222 (e.g., the left second sliding slot 222 as shown in FIG. 6). The fourth contact segment 262 is located at the second end of the second linkage lever 26 and inserted into the corresponding second sliding slot 222 (e.g., the right second sliding slot 222 as shown in FIG. 6). The second extension segment 263 is arranged between the third contact segment 261 and the fourth contact segment 262. Moreover, a middle region of the second extension segment 263 is connected with the keycap 24. There is a second gap 264 between the third contact segment 261 and the fourth contact segment 262 of the second linkage lever 26. The combined structure of the second linkage lever 26 and the second movable plate 22 is shown in FIG. 6. Moreover, the second gap 264 is also arranged between the corresponding second fixing parts 221 of the second movable plate 22. In this embodiment, the third contact segment 261 and the fourth contact segment 262 are integrally formed with the second extension segment 263, and the second linkage lever 26 is made of a metallic material.

As shown in FIG. 6, the first gap 254 is arranged between the corresponding first fixing parts 211 of the first movable plate 21, and the second gap 264 is arranged between the corresponding second fixing parts 221 of the second movable plate 22. That is, the first gap 254 and the second gap 264 are in parallel with each other. Moreover, the first gap 254 is near the second extension segment 263, and the second gap 264 is near the first extension segment 253. In other words, the first linkage lever 25 and the second linkage lever 26 are crisscrossed.

Please refer to FIGS. 6 and 7. FIG. 7 is a schematic side cross-sectional view illustrating the key structure according to the embodiment of the present invention, in which the keycap of the key structure is not depressed. As shown in FIG. 6, the keycap 24 comprises plural hooks 241. The plural hooks 241 are protruded from an inner surface of the keycap 24. The middle region of the first extension segment 253 and the middle region of the second extension segment 263 are connected with the corresponding hooks 241. While the middle region of the first extension segment 253 is rotated in the corresponding hooks 241 and relative to the keycap 24, the first linkage lever 25 is swung. Similarly, while the middle region of the second extension segment 263 is rotated in the corresponding hooks 241 and relative to the keycap 24, the second linkage lever 26 is swung. After the components are combined together, the resulting key structure 2 is shown in FIG. 7. Meanwhile, the keycap 24 is at a first height H1.

Hereinafter, the operations of the key structure 2 in response to the depressing action of the user will be illustrated with reference to FIGS. 7 and 8. FIG. 8 is a schematic side cross-sectional view illustrating the key structure according to the embodiment of the present invention, in which the keycap of the key structure is depressed. When the keycap 24 is depressed, the keycap 24 is moved downwardly to push the first linkage lever 25 and the second linkage lever 26 in response to the depressing force. Consequently, the first linkage lever 25 and the second linkage lever 26 are swung relative to the keycap 24. Moreover, as the keycap 24 is moved downwardly to push the corresponding elastic element 27, the elastic element 27 is subjected to deformation to press the membrane switch circuit member 28 and trigger the corresponding key intersection (not shown) of the membrane switch circuit member 28. Consequently, the membrane switch circuit member 28 generates a corresponding key signal. The key structure 2 in the depressed state is shown in FIG. 8.

When the keycap 24 is no longer depressed by the user, no external force is applied to the keycap 24 and the elastic element 27 is no longer pushed by the keycap 24. In response to the elasticity of the elastic element 27, the elastic element 27 is restored to its original shape to provide an upward elastic restoring force to the keycap 24. As the keycap 24 is moved upwardly, the first linkage lever 25 and the second linkage lever 26 are swung. Consequently, the keycap 24 is returned to its original position where it is not depressed (see FIG. 7). While the keycap 24 is moved upwardly or downwardly, the first movable plate 21 and the second movable plate 22 are not moved.

Figure 1:
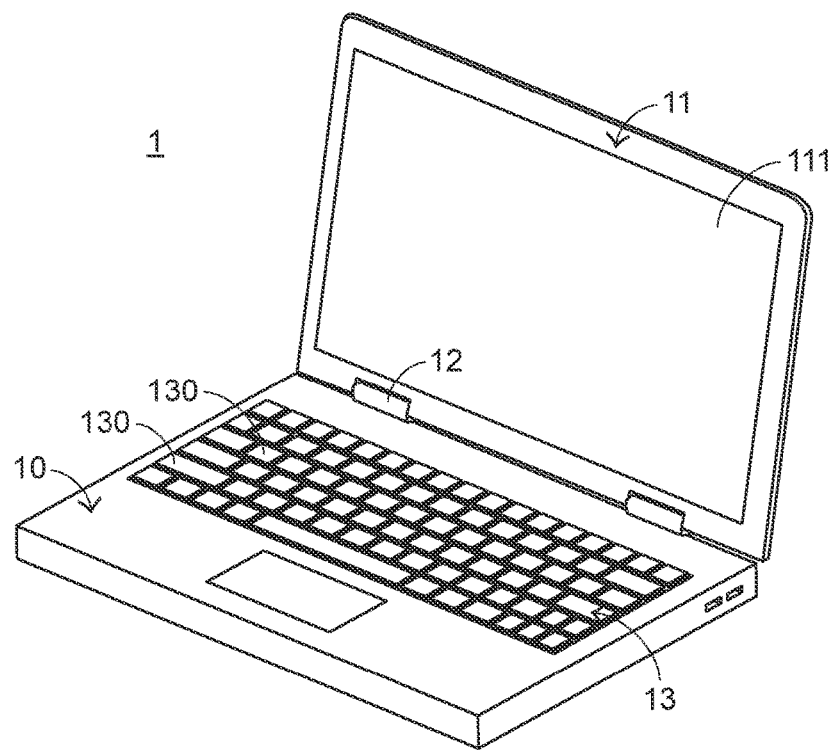
FIG. 1 is a schematic perspective view illustrating the structure of a conventional notebook computer.
Figure 2:
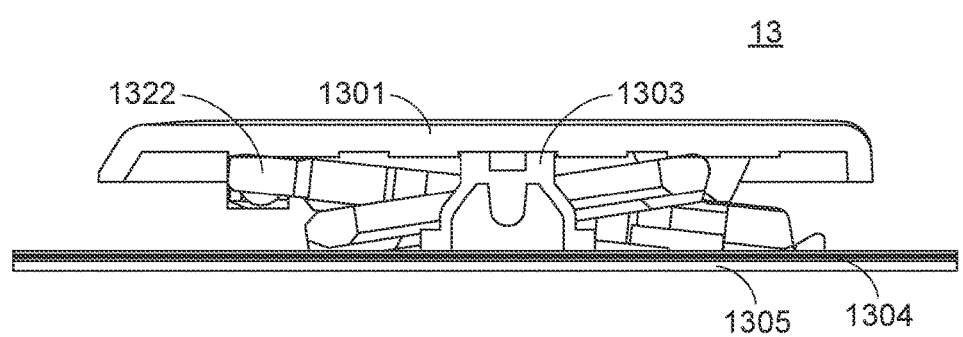
FIG. 2 is a schematic side cross-sectional view illustrating a key structure of a conventional keyboard.
Figure 3:
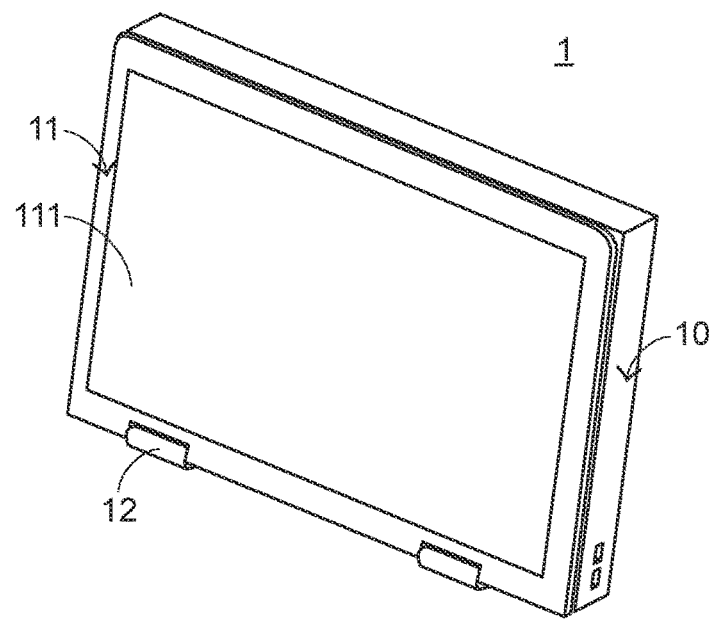
FIG. 3 is a schematic perspective view illustrating a conventional notebook computer having an inversely foldable screen, in which the notebook computer is in a touch control mode.
Figure 9:
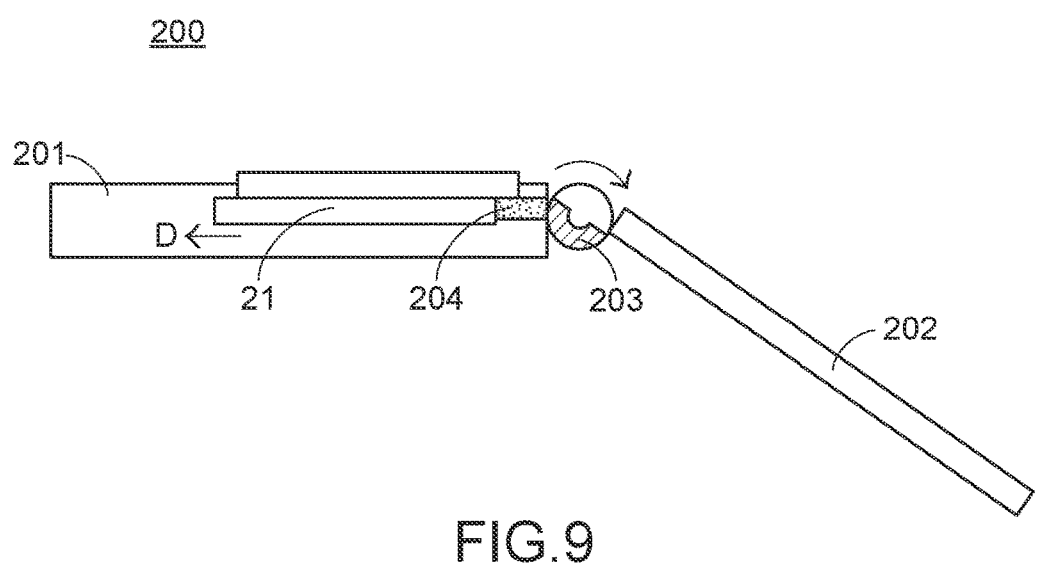
FIG. 9 is a schematic side cross-sectional view illustrating the notebook computer with key structures of the present invention, in which the height of the key structure is changed.
Figure 10:
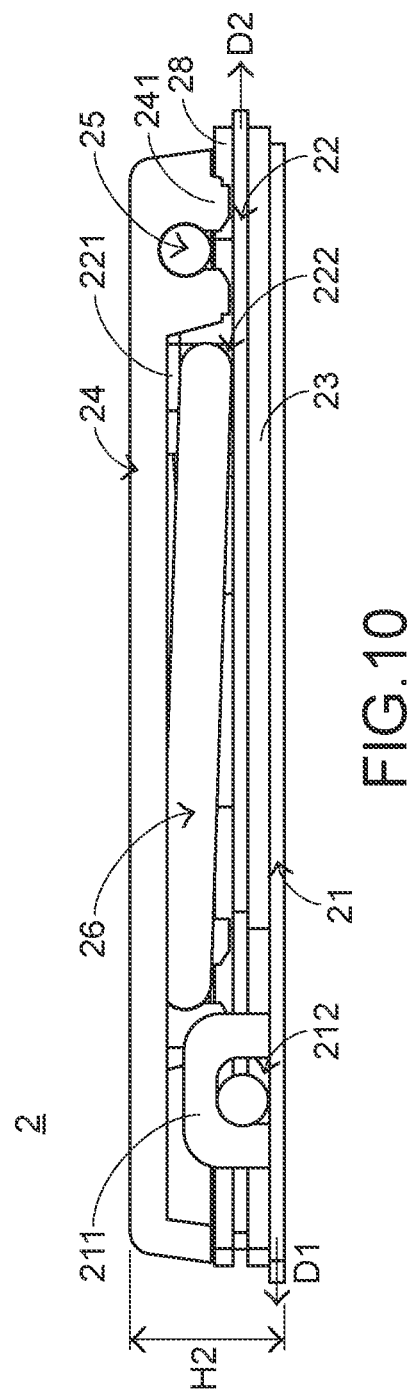
FIG. 10 is a schematic side cross-sectional view illustrating the key structure according to the embodiment of the present invention, in which the height of the key structure is changed.
Figure 11:
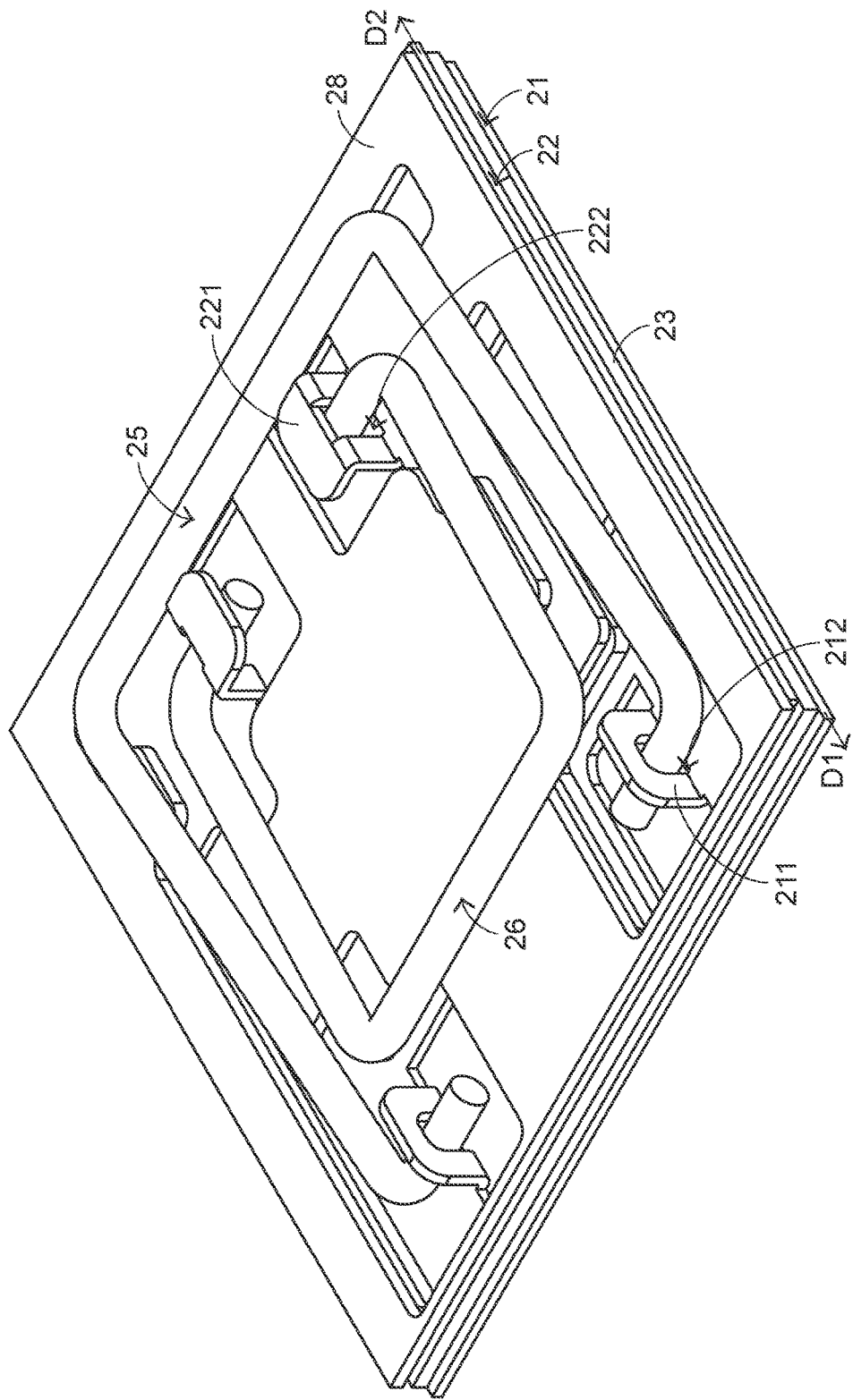
FIG. 11 is a schematic perspective view illustrating a portion of the key structure according to the embodiment of the present invention, in which the height of the key structure is changed.

Hereinafter, a process of changing the height of the key structure 2 will be illustrated with reference to FIGS. 9, 10 and 11. FIG. 9 is a schematic side cross-sectional view illustrating the notebook computer with key structures of the present invention, in which the height of the key structure is changed. FIG. 10 is a schematic side cross-sectional view illustrating the key structure according to the embodiment of the present invention, in which the height of the key structure is changed. FIG. 11 is a schematic perspective view illustrating a portion of the key structure according to the embodiment of the present invention, in which the height of the key structure is changed. For switching the operation mode of the notebook computer 200 from the usage mode to the touch control mode (see FIG. 3), the top cover 202 is folded in a clockwise direction to allow the top cover 202 to be contacted with the rear surface of the keyboard base 201. While the top cover 202 is folded in the clockwise direction, the rotary shaft 203 is rotated to push the transmission mechanism 204 and thus the transmission mechanism 204 is moved in a first direction D1 to push the first movable plate 21. The transmission mechanism 204 comprises the structure for changing the exerted force. An example of the structure for changing the exerted force includes but is not limited to the assembly of a gear and a rack. Consequently, while the first movable plate 21 is moved in the first direction D1, the second movable plate 22 is moved in a second direction D2. The second direction D2 is opposed to the first direction D1.

While the first movable plate 21 is moved in the first direction D1, the plural first fixing parts 211 of the first movable plate 21 are moved in the first direction D1 to push the first contact segment 251 and the second contact segment 252. Consequently, the first linkage lever 25 is switched from the original state of FIG. 7 to the stored state of FIG. 10. Moreover, while the second movable plate 22 is moved in the second direction D2, the plural second fixing parts 221 of the second movable plate 22 are moved in the second direction D2 to push the third contact segment 261 and the fourth contact segment 262 of the second linkage lever 26. Consequently, the second linkage lever 26 is switched from the original state of FIG. 7 to the stored state of FIG. 10. Meanwhile, the height of the keycap 24 is changed from the first height H1 to a second height H2. That is, when the notebook computer 200 is in the touch control mode, the height of the keycap 24 is reduced to the second height H2. Meanwhile, even if the user presses the keycap 24, the keycap 24 is not moved downwardly. While the first movable plate 21 and the second movable plate 22 are moved, the first movable plate 21 and the second movable plate 22 are separated from each other by the separation plate 23. Consequently, even if the first movable plate 21 and the second movable plate 22 are moved in opposed directions, the first movable plate 21 and the second movable plate 22 are not interfered by each other.

For switching the operation mode of the notebook computer 200 from the touch control mode to the usage mode, the rotary shaft 203 is rotated to push the transmission mechanism 204 and thus the transmission mechanism 204 is moved in the second direction D2 to push the first movable plate 21. Consequently, while the first movable plate 21 is moved in the second direction D2, the second movable plate 22 is moved in the first direction D1. Consequently, the first linkage lever 25 and the second linkage lever 26 are switched from the stored state of FIG. 10 to the original state of FIG. 7. Meanwhile, the height of the keycap 24 is changed to the first height H1.

The following two aspects will be specially described. Firstly, the notebook computer 200 is further equipped with a control unit (not shown). When the control unit detects that the notebook computer 200 is in the touch control mode, the control unit disable the membrane switch circuit member 28 to generate the key signal. That is, regardless of whether the key structure 2 is depressed, no key signal is generated when the notebook computer 200 is in the touch control mode. Secondly, the elastic element 27 is a component of the key structure 2 for returning the keycap 21 in the vertical direction. It is noted that the component for returning the keycap 21 in the vertical direction is not restricted. For example, in another embodiment, the key structure further comprises two magnetic elements. One of the magnetic elements is installed on the keycap, and the other magnetic element is installed on the second movable plate or the membrane switch circuit member. When the keycap is depressed, the two magnetic elements interact with each other to generate a repulsive force. In response to the repulsive force, the keycap is moved upwardly and returned to its original position. However, in this case, a protrusion structure is formed on an inner surface of the keycap to trigger the membrane switch circuit member.

From the above descriptions, the key structure of the present invention uses the first linkage lever and the second linkage lever as a mechanism for lifting or lowering the keycap. The first linkage lever is connected with the keycap and the first movable plate. The second linkage lever is connected with the keycap and the second movable plate. For reducing the height of the keycap, the first movable plate is controlled to be moved in the first direction and the second movable plate is correspondingly moved in the second direction. Consequently, the first linkage lever is moved in the first direction and the second linkage lever is moved in the second direction. Under this circumstance, the keycap is moved downwardly, and thus the height of the keycap is reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A key structure, comprising:
   a first movable plate;
   a second movable plate disposed over the first movable plate;
   a separation plate arranged between the first movable plate and the second movable plate, wherein the first movable plate and the second movable plate are separated from each other by the separation plate;
   a keycap disposed over the second movable plate, and movable relative to the separation plate;
   a first linkage lever connected with the keycap and the first movable plate, wherein a first end and a second end of the first linkage lever are movable on the first movable plate; and a second linkage lever connected with the keycap and the second movable plate, wherein a first end and a second end of the second linkage lever are movable on the second movable plate, wherein while the first movable plate is moved in a first direction and the second movable plate is moved in a second direction opposed to the first direction, the first linkage lever is pushed by the first movable plate in the first direction and the second linkage lever is pushed by the second movable plate in the second direction, so that a height of the keycap is reduced.

2. The key structure according to claim 1, wherein the first movable plate comprises:

plural first fixing parts disposed on a top surface of the first movable plate, wherein the first linkage lever is fixed on the first movable plate by the plural first fixing parts; and plural first sliding slots corresponding to respective first fixing parts, wherein each of the plural first sliding slots is arranged between the corresponding first fixing part and the first movable plate, so that the first end and the second end of the first linkage lever are inserted into the corresponding first sliding slots.

3. The key structure according to claim 2, wherein the plural first fixing parts are integrally formed with the first movable plate.

4. The key structure according to claim 2, wherein the first linkage lever comprises:

a first contact segment located at the first end of the first linkage lever and inserted into the corresponding first sliding slot;

a second contact segment located at the second end of the first linkage lever and inserted into the corresponding first sliding slot; and a first extension segment arranged between the first contact segment and the second contact segment, wherein a middle region of the first extension segment is connected with the keycap, wherein while the first movable plate is moved in the first direction, the plural first fixing parts are moved in the first direction to push the first contact segment and the second contact segment, so that the first linkage lever is moved in the first direction.

5. The key structure according to claim 4, wherein there is a first gap between the first contact segment and the second contact segment of the first linkage lever, and the first gap is arranged between the corresponding first fixing parts of the first movable plate, wherein the first contact segment and the second contact segment are integrally formed with the first extension segment.

6. The key structure according to claim 4, wherein the keycap comprises plural hooks, the plural hooks are protruded from an inner surface of the keycap, and the middle region of the first extension segment is connected with the corresponding hooks, wherein while the middle region of the first extension segment is rotated in the corresponding hooks and relative to the keycap, the first linkage lever is swung.

7. The key structure according to claim 1, wherein the second movable plate comprises:

plural second fixing parts disposed on a top surface of the second movable plate, wherein the second linkage lever is fixed on the second movable plate by the plural second fixing parts; and plural second sliding slots corresponding to respective second fixing parts, wherein each of the plural second sliding slots is arranged between the corresponding second fixing part and the second movable plate, so that the first end and the second end of the second linkage lever are inserted into the corresponding second sliding slots.

8. The key structure according to claim 7, wherein the plural second fixing parts are integrally formed with the second movable plate.

9. The key structure according to claim 7, wherein the second linkage lever comprises:

a third contact segment located at the first end of the second linkage lever and inserted into the corresponding second sliding slot;

a fourth contact segment located at the second end of the second linkage lever and inserted into the corresponding second sliding slot; and a second extension segment arranged between the third contact segment and the fourth contact segment, wherein a middle region of the second extension segment is connected with the keycap, wherein while the second movable plate is moved in the second direction, the plural second fixing parts are moved in the second direction to push the third contact segment and the fourth contact segment, so that the second linkage lever is moved in the second direction.

10. The key structure according to claim 9, wherein there is a second gap between the third contact segment and the fourth contact segment of the second linkage lever, and the second gap is arranged between the corresponding second fixing parts of the second movable plate, wherein the third contact segment and the fourth contact segment are integrally formed with the second extension segment.

11. The key structure according to claim 9, wherein the keycap comprises plural hooks, the plural hooks are protruded from an inner surface of the keycap, and the middle region of the second extension segment is connected with the corresponding hooks, wherein while the middle region of the second extension segment is rotated in the corresponding hooks and relative to the keycap, the second linkage lever is swung.

12. The key structure according to claim 1, further comprising:

a membrane switch circuit member disposed over the first movable plate, wherein as the keycap is moved, a key signal corresponding to the keycap is generated by the membrane switch circuit member; and an elastic element arranged between the keycap and the membrane switch circuit member, wherein when the elastic element is pushed by the keycap, the membrane switch circuit member is triggered by the elastic element, wherein when the keycap is no longer depressed, the elastic element provides an elastic force to the keycap, the keycap is moved in response to the elastic force, and the first linkage lever and the second linkage lever keycap are swung with the keycap.

* * * * *